Fig.1.

Feb. 19, 1935.   R. F. HALL   1,992,157
AIRPLANE
Filed Nov. 22, 1932   3 Sheets-Sheet 2

Inventor
Randolph F. Hall
By
Attorney

Feb. 19, 1935.    R. F. HALL    1,992,157
AIRPLANE
Filed Nov. 22, 1932    3 Sheets-Sheet 3 and 1,992,157

UNITED STATES PATENT OFFICE 1,992,157

AIRPLANE

Randolph F. Hall, Kenmore, N. Y.

Application November 22, 1932, Serial No. 643,917

44 Claims. (Cl. 244—29)

This invention relates to certain improvements in airplanes; and the nature and objects of the invention will be readily recognized and understood by those skilled in the aeronautical art in the light of the following explanation and detailed description of the accompanying drawings illustrating what I at present consider to be the preferred embodiments or aerodynamical and mechanical expressions of my invention from among various other forms, arrangements, combinations and constructions of which my invention is capable within the spirit and the scope thereof.

My present invention is primarily concerned and deals with airplane wings generally of the so-called "high" or "variable lift" types, but is more specifically directed, although in its generic and broad aspects is not so limited, to those forms of such types of wings that embody and include a wing lift capacity varying member or members, either automatically or manually controlled and actuated, and lateral control means or members together with an operating system for such lateral control means. With a high or variable lift wing as generally typified above, certain design and structural difficulties and certain aerodynamic inefficiencies are encountered as a result of interference between and the aerodynamic effect on each other of, the variable lift means and the lateral control, so that, under certain flight conditions the efficiency of such a wing and the effectiveness of the lateral control are materially impaired.

It is a general aim and object of this invention to remedy the foregoing problems and difficulties by so coordinating, interrelating and synchronizing the operation and relative movements and positions of the variable lift means and the lateral control means, as to increase the efficiency of the wing and the effectiveness of the lateral control throughout the flight range, but especially to increase lateral control effectiveness under critical flight conditions with the wing at or near stalled flight; and further to provide a design and structural arrangement of such a wing in which low weight with strength and high factor of safety are retained, rendering the wing adaptable to high performance types of aircraft, but which is capable of practical, relatively low cost production.

An essential feature and characteristic of a high lift wing embodying and carrying out the invention, is presented by the provision for maintaining a positive relationship between certain movements of the variable lift means and the lateral control means of the wing, so that such means are relatively positioned with respect to each other to aerodynamically cooperate throughout the flight range to eliminate aerodynamic and structural interference therebetween, and to maintain or increase lift and effectiveness of the lateral control.

Another feature of the invention as applied to a high or variable lift wing having a lift varying means and a lateral control system which includes lateral control surfaces, resides in positively connecting and interrelating the lift varying means of the wing with the lateral control system in such a manner that operation of the lift varying means to change the lift capacity of the wing, causes an actuation of the lateral control system to positively reset and readjust the lateral control surfaces with respect to and in aerodynamic cooperation with the change in the lift varying means.

A further feature of the invention is found in the interconnection and relation between the lateral control system and the lift varying means by which actuation of the lateral control system during high lift or high angle of attack flight, will cause an actuation automatically of the lift varying means in a manner tending to increase speed of flight and change the wing center of pressure and thereby either avoid or materially reduce the possibilities of stalled flight.

Another feature of the invention is the arrangement of and interrelation between the lift varying means and the lateral control system, by which effective control for generating roll near or beyond the condition of stalled flight is obtained, without developing material adverse yaw characteristics.

With the invention embodied in those types of high or variable lift wings in which the lift varying means is formed by an under surface camber varying wing flap or flaps, and the lateral control is formed of ailerons providing portions of the wing upper surface, the invention is featured by an interrelation and positive connection between the aileron operating system and the wing flap or flaps, by which the ailerons are caused to lower by lowering of the wing flaps and to rise with the raising of the wing flaps, in order to maintain a positive relation between the flaps and ailerons carrying out the required wing contour and airfoil section for efficient performance under the various lift varying and flight conditions.

The above arrangement and characteristic is further featured by provision for both the wing flaps and the ailerons under certain flight conditions to automatically assume and take raised positions in which they are slightly deflected or raised upwardly into negative angle positions, for the purpose of reducing wing center of pressure movement or travel and consequently reducing the loads to which the wing is subjected under such flight conditions.

A further object and feature of the invention resides in the design and arrangement of a lateral control system for cooperative embodiment in high or variable lift wings, of the type in which lateral control is obtained solely through raising or up aileron movements, and in the provision of positively actuated mechanism operatively coupling the ailerons for positively raising one aileron without substantially lowering movement of the opposite aileron with which the raising aileron is positively connected through such mechanism; and further to provide such a lateral control system which is of general adaptation to airplane wings of not only the high or variable lift types but to conventional or other types of wings as well.

The lateral control system of the invention is further characterized by a provision for adjusting the elements thereof for the purpose of causing the lateral control surface opposite the normal raising or up control surface to either raise or lower slightly or both slightly raise and lower, during the raising or up movement of the opposite lateral control surface.

With the foregoing general objects, features and characteristics in view, as well as certain others which will be recognized from the following explanation, the invention consists in certain novel features in design and construction, and in the combination and cooperative arrangements of the elements thereof, all as will be more fully and particularly referred to and specified hereinafter.

Referring to the accompanying drawings in which similar reference characters refer to corresponding parts and elements throughout the several figures thereof.

As one of the further objects of my invention also resides in the improvement and refinement in the design, arrangement, and construction of a high or variable lift wing of the "Hall" type, exemplified by the U. S. Patents 1,559,091; 1,723,778; 1,827,845; and 1,875,593, and particularly to the automatic forms thereof, a high lift wing of such type has been selected and is disclosed herein in a design and arrangement thereof embodying and incorporating the lateral control principles and features of the invention. Reference is here made to the foregoing patents, in connection with the following description, for an explanation and discussion of the broad and generic principles and the functioning of such types of wings.

Figure 1:
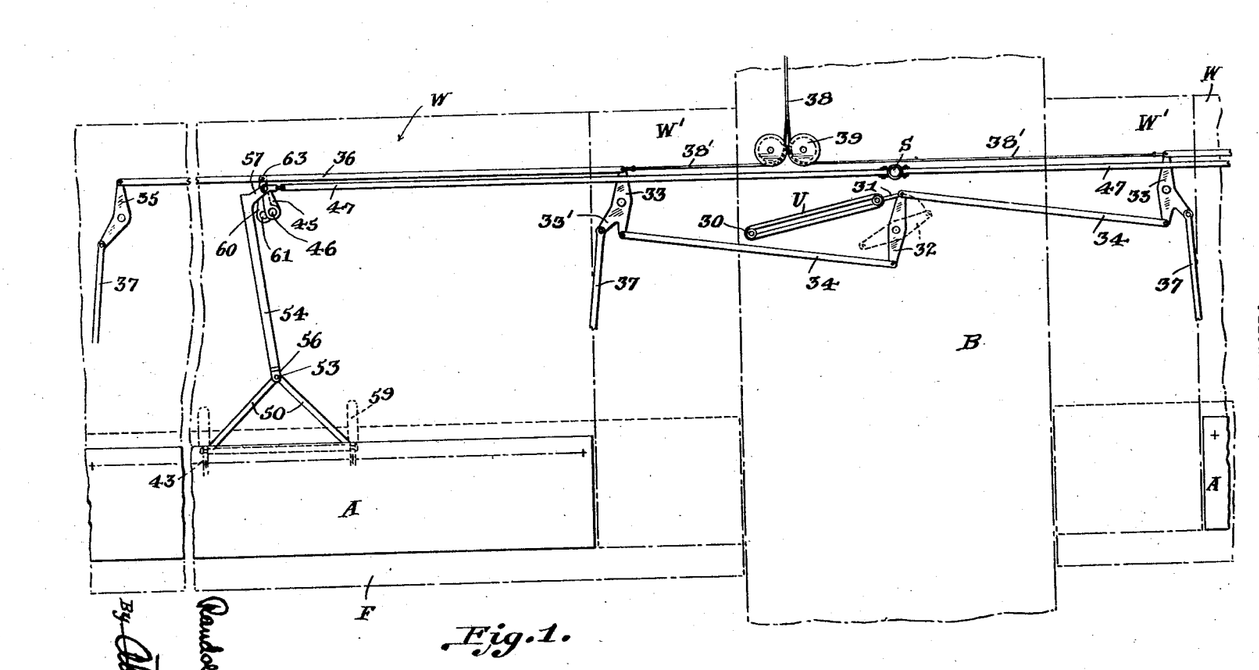
Fig. 1 is a top plan view, more or less diagrammatic and in outline, of portions of the fuselage and the high lift wings, including the lift varying flap members and ailerons of the wings, of an airplane, and showing, more or less diagrammatically, the aileron and lift varying flap systems embodying and in operative relation and connection in accordance with the invention.
Figure 2:
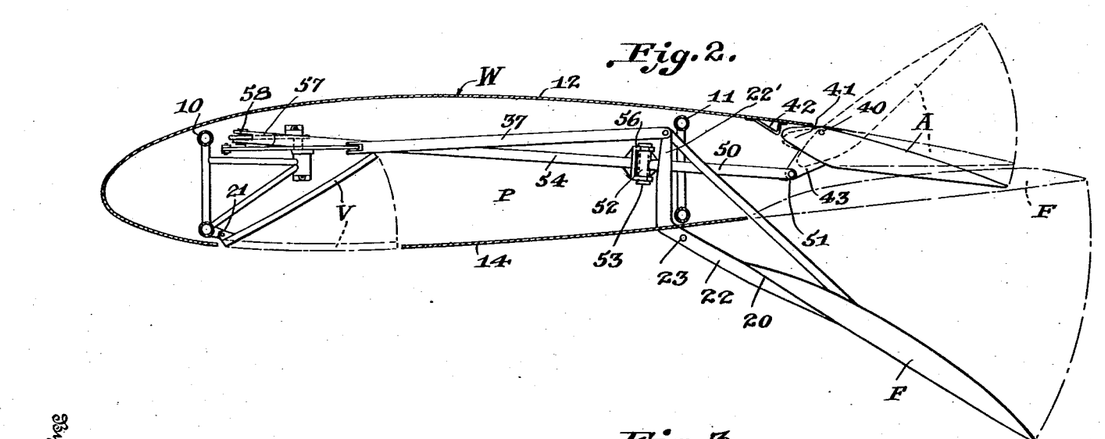
Fig. 2 is a vertical, transverse section through a high lift wing of the type of wing of Fig. 1 with various features of the invention embodied therein, and showing the wing flap and aileron in normal high angle of attack flight positions in full lines, and in normal low angle of attack flight positions in dotted lines; the raised, lateral control position of the aileron also being shown in dotted outline.

A form of automatically functioning high or variable lift wing of the foregoing type, designed and constructed in accordance with and embodying and incorporating the principles and the several features of my present invention, is illustrated in Figures 1 and 2 of the accompanying drawings. In Figure 1 of the drawings, portions of an airplane are more or less diagrammatically shown as including the fuselage or body "B" and the opposite wings "W" of the invention. In this instance the wings "W" are of the separate type mounted at their inner or root ends to the opposite wing stubs W' on fuselage B, but it is to be clearly understood that the wing of the invention is in no sense limited to any particular mounting therefor or arrangement thereof, and in the example here shown opposite wings W can be of the continuous type, part of a multiplane cellule or of other wing arrangements.

A wing W, referring now particularly to Figure 2, in connection with Figure 1 of the drawings, is formed to provide the longitudinally disposed air displacement passage P extending rearwardly therethrough between the spaced upper and lower skin or covering of the wing, substantially throughout the wing span in the present example, and having its inlet end opening downwardly through the lower covering or surface of the wing adjacent and along the wing leading edge portion, controlled by a forward vane V mounted for inward swinging. The passage P has its discharge end adjacent and along the wing trailing edge and below the upper trailing surface portion of the wing, and this passage discharge is controlled by a vertically swinging flap member F. Thus flap member F is located forming a portion of the wing under surface with its trailing edge, in this instance, extending rearwardly a distance beyond the upper wing surface trailing edge, and in normal raised, passage P closing position forms a portion of and carries out the normal high speed contour of the wing under surface, with its trailing edge forming the wing trailing edge. (See doted line position of flap F in Figure 2.) The forward vane V in lowered normal passage inlet closing position forms a portion of the wing under surface and carries out the normal contour thereof. (See dotted line position of vane V in Figure 2.)

The front vane V and the rear under flap F extend in the example hereof, substantially throughout the full span of each wing W (see Figure 1) and a lateral control surface or aileron A designed and positioned in accordance with certain features of the invention, is mounted on each wing W extending a substantial distance along the span thereof, above under flap F and forming the trailing portion of the wing upper surface, so that in normal raised position of flap F and normal neutral position of aileron A, the passage P is closed at the rear, discharge end thereof, and the flap and aileron substantially join or meet to define and carry the normal high speed upper and lower surface contours of the wing merging at and into the wing trailing edge, as will be clear from the dotted line positions of flap F and aileron A in Figure 2 of the drawings.

A wing W of the invention is preferably, although not necessarily, of metal construction, and includes, referring to Figure 2, a forward wing beam 10 and a rear wing beam 11, both of which are preferably of the open truss, lattice type of construction for rearward flow of air in passage P therethrough. The upper and lower surfaces of the wing are formed by the upper and lower, preferably, metal skin or covering 12 and 14, respectively, secured on and across wing beams 10 and 11, and the usual spaced transverse ribs (not shown) connecting such beams, or other beam relating and wing frame forming structure. The upper surface forming metal skin 12 extends rearwardly to the trailing edge of the aileron A inboard and outboard of such aileron, but along the span of aileron A terminates at the aileron leading edge portion. The lower surface forming metal skin or covering 14 is provided with the passage P inlet, opening controlled by the forward vane V, and extends rearwardly to the leading edge 20 of wing under flap F, with such flap in its raised position, so that the flap under surface forms a rearward continuation of skin 14 to carry out the wing contour, as will be clear by reference to the dotted line position of the flap F in Figure 2.

The forward wing beam 10 is disposed in position in the wing located adjacent the forward edge of the under surface inlet opening to passage P, and the front vane V is pivotally supported along its forward edge by pivot members 21 at intervals along and preferably supported on or from forward beam 10. Vane V is thus mounted for vertical swinging inwardly of the wing to inlet open position shown in full lines in Figure 2, from inlet closing position forming a portion of the wing under surface, as shown by dotted lines in Figure 2.

The rear wing beam 11, in the example hereof, is disposed in the wing spaced forwardly of the rear edge of lower skin 14, and of the leading edge 20 of flap F. The flap F is vertically swingably mounted and supported on the forwardly extended arms or members 22 spaced along its span, only one of which arms 22 is shown in Figure 2, and pivotally mounted at their forward ends on and around an axis or hinge mounting 23, below and preferably supported on or from the rear wing beam 11. The rear wing flap F may be of conventional airfoil section and the arms or members 22 provide a remote hinge mounting for the flap, such that in downwardly swung lowered position, as shown in full lines in Figure 2, a space or air passage is formed between the wing under surface and the leading upper edge 20 of flap F.

A wing W is of the automatically functioning type in which front vane V and rear under flap F are actuated by and in accordance with flight and attendant air flow conditions, so that, with the wing under low attack angle or high speed conditions, the vane V and flap F assume their normal passage closing position shown by dotted lines in Figure 2, while with the wing under high attack angle or low speed flight conditions, the vane and flap automatically swing to the full line positions of Fig. 2 for increasing the wing camber and for displacement of air rearwardly through passage P, with resulting increase in the lift capacity of the wing.

With the arrangement of opposite wings W and the opposite flaps F, respectively, thereof, the invention incorporates a wing flap control system which includes the provision of an initial force unit for applying a force to the wing flaps, such that, when the wings are under high angle of attack or low speed flight conditions, downward swinging of the flaps to air-displacement passage opening and wing camber increasing position, is insured and rendered positive. Upward swinging of the wing flaps F to normal raised position with the wing at low attack angle or high speed flight conditions, is caused by air pressures acting on the flaps which overcome the lowering forces exerted on the flaps by such an initial force unit.

An arrangement of wing flap control system is disclosed in Figure 1 of the drawings, and includes an initial force unit U which, in the particular example hereof, is in the form of an elastic or resilient cord or spring that is fixed at one end at 30 to the fuselage B, and at its opposite free end is connected by a shackle 31 to one arm of crank 32. The crank 32 is pivotally mounted on fuselage B for horizontal swinging about an axis disposed on the longitudinal center line, in the specific example hereof, of the fuselage. In the normal contracted position of the force unit U, the crank 32 is swung thereby to the full line position of Figure 2, in which it is disposed substantially longitudinally of the fuselage B. This is substantially the position of crank 32 for the lowered or downwardly swung positions of the wing flaps F.

The wing flaps F are operatively coupled to the force unit actuated crank 32, by an arrangement of cranks and push-pull tubes, which includes the cranks 33 at and adjacent opposite sides, respectively, of the fuselage F and mounted in the root or inner end portions or wings W, or as in the particular example hereof, in the opposite wing stubs W'. Each crank 33 has one arm thereof pivotally coupled by a rod or tube 34 to one arm of the crank 32, so that the tubes 34 are coupled at their inner ends to the opposite arms, respectively, of crank 32. Spaced outwardly in each wing W from, and substantially alined longitudinally of the wing with, the inner crank 33, is a crank 35, the inner or forward arm of which is pivotally connected with the corresponding arm of crank 33, by a push-pull tube 36. It so happens that Figure 1 of the drawings only shows the crank 35 of the left wing W, but it is, of course, understood that the crank 35 for the right wing is similar thereto and correspondingly mounted and positioned. The cranks 33 and 35 in each wing W are so spaced that they are alined chordwise of the wing with hinge members or arms 22, respectively, of the wing flap F. While but one crank 35 is indicated in the drawings, it is to be understood that any required or desired number thereof may be utilized.

The crank 33 of each wing W is provided with a branch arm 33' adjacent that arm of the crank to which tube 34 is coupled, and such branch arm is pivotally coupled by a tube 37 which extends rearwardly therefrom, to an upstanding or vertically disposed arm 22' of one of the hinge members 22 of the flap F, as will be clear by reference to Figure 2 of the drawings. Similarly, a tube 37 operatively couples that arm of each crank 35 which is opposite the arm to which tube 36 is coupled, with the vertical arm 22' of a wing flap hinge member 22 (see Fig. 2).

Thus, when force unit U acts to swing or rotate crank 32 to the full line position of Figure 1, the tubes 34 are pulled inwardly to rock cranks 33 and 35, through coupling tubes 36, which forces tubes 37 rearwardly to lower or swing the opposite wing flaps F downwardly to their high attack angle or low speed flight positions of Figure 2. Under low attack angle or high speed flight conditions the air pressures act on the flaps F to force or swing them upwardly to the dotted line position shown in Figure 2, against and overcoming the force exerted on the flaps by the unit U. Raising of the flaps, through the described crank and push-pull tube arrangement, rotates crank 32 to the dotted line position indicated in Figure 1, with the force unit U expanded and placed under additional tension continuously exerting a force to rotate crank 32 back to flap lowered, full line position of Figure 1.

Attention is here directed to the fact that, other forms, types and arrangements of force unit and wing flap control systems, may be employed, and are contemplated where found expedient. For example, a force unit may be inserted between or directly connect the cranks 33, in the manner taught by my co-pending U. S. patent application, filed August 18, 1930, Serial No. 476,155, now Patent 1,959,236 granted May 15, 1934, or the other force unit arrangements and their equivalents, disclosed by such application may be employed. Further, while the wings W of the example here given are of the automatically functioning type, it is to be clearly understood that the invention also includes variable lift wings of the manually operable flap types, or of the automatic types without force unit actuation and control, and there is no intent or desire to limit my invention in every phase thereof to the wing flap arrangements and their control systems as here shown by way of an example.

A portion of a system for taking up slack, and for limiting automatic flap movement, raising the wing flaps, or for emergency operation of the flaps is disclosed in Figure 1 of the drawings as including a control cable 38 leading from a suitable pilot control unit or mechanism (not shown) which cable terminates in the branch cables 38'. The branch cables extend rearwardly to and pass around pulleys 39 mounted intermediately opposite wing cranks 33, and then outwardly to and are connected with the cranks 33, respectively. As such a system is fully disclosed and is claimed in the U. S. Letters Patent No. 1,875,593, issued to me September 6, 1932, it is not deemed necessary to here fully disclose and explain the same, but reference may be had to the aforesaid patent for a disclosure and explanation.

The lateral control system forming a feature of the invention, includes the ailerons A which, as hereinbefore referred to, are each mounted on a wing W above and along a wing flap F and form a portion of and carry out the wing upper surface and contour. Each aileron A is mounted for vertical swinging on an axis 40 (see Fig. 2) which is disposed spaced from the leading edge and in the upper portion of the aileron. Such mounting of the aileron provides the leading edge portion as a balance 41 which extends forwardly beneath the upper covering 12 of the wing, with the upper surface of the aileron substantially flush with and in unbroken rearward continuation of the wing upper surface, when the aileron is in its neutral position as shown in Fig. 2. If desired, a member 42 may be provided, on the underside of the wing covering 12 along and in front of the aileron leading edge balance portion 41, to serve as a structural element of the wing, and as a fairing for the aileron when in its neutral position. (See Fig. 2.)

In the example hereof, each aileron A is also provided at its forward under side with a pair of forwardly and downwardly extended, spaced horns or cranks 43, having their bases disposed substantially located below the aileron hinge axis 40. (See Figs. 1 and 2.) The aileron cranks 43 thus provide spaced-apart points of operative connection to the aileron control mechanism, by which rearward movement of the forward free ends of the cranks will swing the aileron upardly around axis 40 to the dotted line, raised position of Fig. 2, and forward movement will lower the aileron.

By providing each aileron with the leading edge balance portion 41, when the aileron is swung to its raised position shown by dotted lines in Fig. 2, the balance portion extends into the wing passage P and causes displacement of air from the passage upwardly through the space between the aileron and the upper wing covering 12. This discharge of air interrupts and breaks up the air flow above the wing and reduces lift while increasing the effectiveness of rolling control, and also is accompanied by favorable yaw due to the additional drag. The airfoil section and upper surface contour of each aileron A is also such that, with the aileron in its neutral position and the wing flap F therebelow in its raised position, the aileron and flap meet and join to close passage P and form and carry out the high speed airfoil section and contour for the wing W, as clearly shown by Figure 2.

The lateral control system of the present invention is preferably designed and arranged to obtain control through raising or up aileron movement only, that is, when one of the ailerons A is raised, the opposite aileron remains approximately in its neutral position and without substantial movement. An arrangement of pilot control mechanism for carrying out such lateral control relative movements of the ailerons A is here disclosed as an example, and includes the usual pilot's control stick S, referring now to Figs. 1 and 5 of the drawings, or other suitable pilot actuated control element or member, mounted at the proper location in the fuselage F. In each wing W, referring to Figs. 1 and 3, a horizontally disposed crank 45 is mounted on a vertically disposed pivot 46 for rotation or swinging thereon. Each crank 45 is mounted in a wing W, in this instance, adjacent the flap control system tube 36, and extends normally forwardly from its pivot 46 with its free end proximate to such tube 36.

Figure 5:
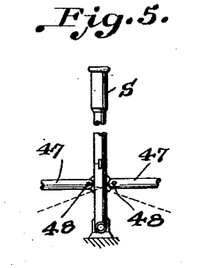
Fig. 5 is a detail view in elevation, more or less diagrammatic, of the pilot's control stick of Fig. 1, showing its operative connection with the lateral control actuating push and pull tubes.

Lateral control actuating tubes 47 are pivotally connected to the free ends, respectively, of the cranks 45 and extend inwardly to and are pivotally coupled to the respectively adjacent sides of the control stick S, at 48 (see Fig. 5). Lateral control movements of stick S are translated through tubes 47, to opposite swinging of the cranks 45 on their pivots 46. The pivotal connection of each tube 47 with a crank 45 is adjustable to vary the length of each tube, that is, to adjust or vary the spacing or distance between each crank and the stick S, for a purpose to be explained hereinafter. Such an adjustable coupling may, for example, take the form of the jaw bolt 47a with a lock nut, threaded and adjustable on the end of a tube 47, as clearly shown in Fig. 3 of the drawings, the jaw bolt being pivotally coupled to the free end of the crank 45.

The forwardly and downwardly extended aileron cranks 43 of each aileron A, are pivotally coupled to the opposite legs of a triangular member 50 by the pivot bolts 51, and such triangular member at its forward end is provided with a T-head which forms a vertical bearing 52 for a pivot bolt 53, as will be clear by reference to Fig. 2 of the drawings in particular. A push-pull member or tube 54 operatively couples and connects the forward free end of the lateral control crank 45 of each wing W, with the forward T-head of the triangular member 50 that is coupled to aileron A. The rear end of each tube 54 is provided with a fork or yoke member 56 which pivotally fits over the upper and lower ends of the pivot bolt 53 carried in the vetrical bearing 52 of the member 50 T-head (see Fig. 2). The forward end of each push-pull tube 54 is formed and provided with the laterally offset, inwardly and forwardly inclined arm 57 which terminates in a fork 58 pivotally fitted over and coupled to the free end of the lateral control crank 45.

Each push-pull tube 54 extends spaced outwardly, that is on the outer side of its aileron crank 45, and the arm 57 thereof then extends inwardly and forwardly to the forward free end of the crank. As a result of this mounting and arrangement of the tubes 54 connecting cranks 45 with the ailerons A, respectively, of opposite wings W, when one crank 45 is swung outwardly by actuation of control stick S, the opposite wing crank 45 is swung inwardly. The outwardly swinging crank 45 will move tube 54 rearwardly, and through triangular member 50 and aileron cranks 43, will swing such aileron A upwardly into a raised position, such as indicated by dotted lines in Figure 2. The inward swinging movement simultaneously imparted to the opposite wing crank 45, will, however, result in no substantial movement from its neutral position of the opposite aileron A, because such crank when rotating, inward, swings through an arc near dead center with respect to the fore and aft motion of the tube 54 and member 50, as will be clear from Figs. 1 and 3 of the drawings. In other words, when the lateral control cranks 45 are in their substantially neutral full line positions of Fig. 3, inward swinging of either one of them rotates the forward end of the tube 54 connected therewith inwardly through an arc so located with respect to pivot bolt 53 at the rear end of the tube, that tube 54 swings on pivot bolt 53 without substantial fore and aft movement, and hence without substantial vertical movement of aileron A.

The provision for adjustment in the length of the aileron actuating tube members 47 which connect control stick S with the cranks 45, respectively, enables the variation of the initial setting of the ailerons, so that under certain flight conditions the performance can be improved, and modification and correction of certain characteristics, such as balance, yaw and of stall, can be obtained. As explained hereinbefore, that aileron A opposite the raising or upwardly moving aileron will, due to the control mechanism arrangement, have substantially no, or very small, movement, that is, depressing or lowering movement. Hence, there will result no appreciable or serious interference with a wing flap F therebelow in wing flap raised position.

With the adjustments of members 47, through the jaw bolts and lock nuts 47a, to give neutral aileron at the start of lateral control mechanism movement, as shown by the example illustrated in the accompanying drawings, the aileron A opposite the upwardly swinging or raising aileron is neutral at the start, then very slightly depresses or lowers as upward movement of the opposite aileron continues, and then regains the initial neutral position when the opposite aileron attains its fully raised position.

An adjustment of tube members 47 to lengthen them and increase the spacing between cranks 45 and stick S, will cause the aileron opposite the raising or upwardly swinging aileron, which is in neutral position at the start of lateral control operation, to move downwardly or depress slightly, and to be without motion when the opposite aileron is fully raised.

An adjustment of the tube members 47, to shorten them and reduce the spacing between cranks 45 and stick S, will for neutral position for the aileron opposite the upwardly swinging aileron at the start of the control operation result in no movement through the first part of the operation, and then slightly raising as the opposite aileron reaches its fully raised position. Obviously, the adjustment selected is to be determined by the particular airplane, the exact wing arrangement, and the lateral control surface. It may be noted, however, that the action resulting from the lengthening adjustment may be considered to obtain more effective control results while the shortening adjustment holds the advantage with a wing of the type of the present specific example, in avoiding any possibility of wing flap F and aileron A interference, and in eliminating the necessity of providing for flap and aileron clearance.

The invention further includes the provision for adjustment of the length of the tubes 54 or members 50, in order to permit of re-alignment of the ailerons when the tubes 47 have been adjusted. Such length adjustment of tubes 54 or members 50, is contemplated by the use of means similar to the adjustable jaw bolts and lock nuts 47a for tubes 47, and hence a detail illustration of such means is not deemed necessary at the connection points of the tubes 54 or members 50.

If desired or found expedient weight counterbalances 59, as indicated by dotted lines in Figure 1, may be fixed to and extend forwardly from the cranks 43, respectively, of each aileron A, to provide a static balance of each aileron about its hinge axis 40, to eliminate or reduce possibility of aileron flutter. Attention is also here directed to the fact that the invention recognizes and includes as an alternative aileron mounting in place of the axis 40 near the upper surface, and cranks 43 below such axis, the location of the aileron hinge axis below, with the aileron crank or cranks extending above such hinge axis.

The design and arrangement of tubes 54 each coupled by fork 56 to the T-head 52 of the triangular member 50 by bolt 53, provides, while employing but a single operating point in the wing, an additional support and increased torsional rigidity for each aileron through the spaced arms of the members 50 giving a plurality of spaced connecting points on each aileron. The foregoing together with static balance and a design which locates greatest aileron depth for receiving a deep beam adjacent aileron hinge axis 40, and in combination with the positive and non-yielding type of aileron operating control mechanism hereinbefore described, provides a lateral control system in which possibility of wing flutter or excessive vibration caused by aileron existence is reduced to a minimum. A suitable dash-pot or equivalent arrangement may also be included in the flap or aileron or both control systems to prevent flutter. The wing of the type disclosed with its inherent rigidity and provided with the lateral control system of the invention is peculiarly adapted to installation on high speed aircraft without the usual hazards due to the conditions eliminated as set forth above.

An important feature of the lateral control system of my invention, is the arrangement of the cranks 45 and aileron actuating tubes 54—57, by which actuation of the pilot's control stick S causes an increased angular movement of the raising or upwardly swinging aileron A as the stick S reaches the maximum limit of control movement. By this feature the movements of the pilot's control near neutral do not produce the same extent of lateral control response as is produced for a similar pilot's control movement beyond or away from neutral, with the resulting advantage of avoiding extreme sensitiveness of control or over control. This advantage is of particular value for high performance or high speed aircraft.

In accordance with a main feature of my invention the lateral control system and the flap control system are connected and interrelated in order to obtain certain definite, positive relationships between the wing flap positions and the lateral control surface or aileron positions under various flight conditions. In carrying out this feature of the invention in the particular example here disclosed, each aileron crank 45 of the lateral control system is mounted on and carried by a crank operatively coupled with and floating in the wing flap control system, so that movements of the flap system are transmitted to the control system.

Figure 3:
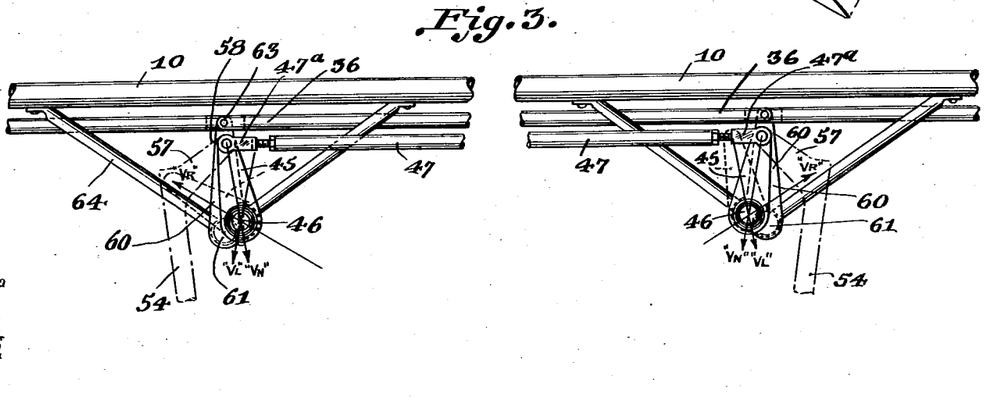
Fig. 3 is a detail fragmentary view in top plan of an arrangement of opposite wing aileron crank members of the lateral control system interconnected and related with the wing flap system in accordance with the invention; the neutral aileron position being shown in full lines and the positions with the left aileron raised in lateral control position being indicated in dotted lines.
Figure 4:
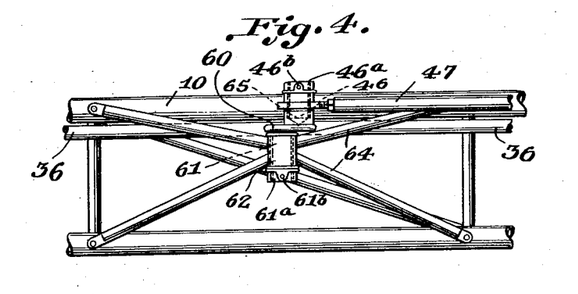
Fig. 4 is a detail fragmentary view in rear elevation of one of the lateral control system crank members of Fig. 3 and its mounting in operative connection with the wing flap system, portions of the wing structure being shown.

Referring now particularly to Figs 1, 3 and 4 of the accompanying drawings, a horizontally disposed crank 60 is pivotally mounted in each wing W for horizontal swinging on a pivot pin or shaft 61 depending from one end of the crank and journaled in a suitable bearing 62 fixed in the wing. Each crank 60 extends forwardly from its pivot 61 and is pivotally coupled and connected at its forward end to a tube or tubes 36 of the flap control system at 63. (See Figs. 1 and 3.) The bearing 62 for each crank 60, is, in the example hereof, mounted on and carried in fixed position by a supporting frame or truss which includes the upper and lower leg members 64 extended rearwardly from the forward wing beam 10, to and converging at the bearing to which they are fixed, although it will be clear that the invention is in no sense limited to any particular mounting and supporting arrangement for the bearings 62. Thus, each crank 60 floats in and is swung inwardly and outwardly about its shaft 61, by inward and outward operating movements of the flap control system tubes 36.

The operative connection and interrelation between the flap control and lateral control systems is made through the respective cranks 60 and 45 of each system, by pivotally mounting the lateral control crank 45 of each wing on the flap control system crank 60 thereof. Each flap control system crank 60 is formed, in the example hereof, with an inwardly and laterally off-set and vertically disposed portion providing a vertical socket 65, adjacent but having its axis spaced relatively slightly forward of the axis of bearing 62 and crank shaft 61, as will be clear by reference to Fig. 3 in particular. The socket 65 on crank 60 fixedly receives the pivot pin or shaft 46 on or about which the lateral control crank 45 is swingable and on which it is mounted and carried by the floating crank 60 of the flap control system, in position extended forwardly along crank 60 with its forward end coupled to tube 47 and the aileron tube 54.

In the particular mechanical expression of the instant example, the crank pin or shaft 61 of each crank 60 is secured in mounted position in bearing 62 by a suitable retaining cap 61a attached over and to the lower end of the shaft by a suitable taper pin or the like, 61b. Similarly, the crank 45 is retained in position on pivot pin or stud shaft 46 by a cap 46a secured over and to the upper end of pivot pin 46 by a taper pin or the like 46b, as clearly shown in Fig. 4 of the accompanying drawings.

With the foregoing arrangement and interconnected and related mounting of the flap control and lateral control systems through the lateral control cranks 45 mounted on the floating flap control system cranks 60, respectively, in each opposite wing W, referring here to Figs. 1, 2 and 3 of the drawings, when the wing flaps F are in their lowered positions and the ailerons A in their normal neutral positions as shown by full lines in Fig. 2, the flap control and lateral control systems, including cranks 60 and 45, are in the full line positions of Figs. 1 and 3. With ailerons A in their neutral positions, upon change in flight to bring wings W to low attack angle, high speed flight conditions, flaps F are swung upwardly and raised against the lowering forces of force unit U, into their dotted line position of Fig. 2, vane V swinging downwardly to its passage inlet closing position shown by dotted lines, as previously explained. The upward swinging of flaps F causes, of course, a simultaneous inward movement of the opposite tubes, 36 of the flap control system, which results in inward swinging of the floating cranks 60 in the opposite wings (see Figs. 1 and 3). As the cranks 60 swing inwardly, due to the location thereon, of the cranks 45 at the inner side of the center lines of cranks 60, the cranks 45 are carried and moved rearwardly, thus forcing members 54—50 rearwardly, and simultaneously raising the ailerons A to the dotted line positions of Fig. 2. This raised position ailerons A is such as to be in definite predetermined relation to the raised positions of flaps F, so that the flaps and ailerons are in efficient profile alinement with, and rearwardly carrying out the base airfoil section for the high speed condition of the opposite wings W.

From the raised and definitely related positions of the ailerons A and flaps F to their lowered positions when the wings assume high angle of attack, low speed flight, a definite relation between the ailerons and flaps is automatically maintained. As the flaps F are swung downwardly under the action of force unit U, the tubes 36 move outwardly and swing cranks 60 outwardly, which simultaneously moves the cranks 45 forwardly to lower the ailerons A through forward movement of aileron members 54—50, so that the ailerons assume a position shown by full lines in Fig. 2. In this manner, the opposite ailerons A are automatically raised and lowered as the wing flaps F rise and lower, and a definite relative position between flaps and ailerons is maintained throughout the flight range, to present and retain maximum efficiency of wing profile, with minimum structural and/or aerodynamic interference between the flaps and ailerons.

Preferably suitable stops are provided for the flaps F in their maximum lowered and raised positions, as for example, in lowered position by control means 38—38', or by the vertical arms 22' of the flap hinge members 22 engaging rear wing beams 11, respectively, of each wing W; while for the raised positions of the flaps, such stops can be provided and located at any desired or suitable points in the flap control system. The ailerons A have been referred to as adjustable for a neutral setting in which they assume a slightly raised or negative angle position for certain performance reasons, and my invention positively includes an adjustment of the stop or stops determining maximum raised positions of the wing flaps F to permit the flaps to also raise into slightly negative angle position, so that under certain flight conditions both the ailerons A and the flaps F will be deflected upwardly a small distance into slightly negative angle positions. The result of such an arrangement is to obtain modified wing performance characteristics together with a tendency to reduce wing center of pressure travel and wing loads under certain conditions of flight.

Now, with respect to the action and effect of the lateral control system on the flaps F through the flap control system, it is to be noted that the reaction of the forces in the tube members 47 and 54 to each aileron A of the lateral control system, is taken in the flap control system through each crank pivot or shaft 46 of the floating cranks 60, and as the lateral control members 47 and 54 are attached at a common point on the axis of each crank 45, it follows that the resultant of these forces in members 47 and 54 acts along the longitudinal axis or center line of each crank 45. Thus, for aileron lowered position shown in full lines in Fig. 2, at high angles of attack of a wing W, or the low angle of attack, neutral position shown in dotted lines in Fig. 2, or within limits with aileron raised by actuation of pilot's control S, the air force on the lateral control surface or aileron A will produce tension in a member 54. When an aileron A is raised a certain amount, the force in member 54 changes to compression. For purposes of explanation, force vectors are indicated in Fig. 3 of the drawings and are designated "VR" for aileron A fully raised; "VL" for aileron lowered; and "VN" for aileron in approximately neutral position.

By reference to Fig. 3, it will be clear that in normal high angle of attack flight with ailerons A in neutral positions, the force "VN" generates a moment about the pivot 61 of each floating crank 60, tending to rotate each of said cranks inwardly of the wings to raise the lowered under flaps F. In order to prevent such flap raising movement, in accordance with the invention, the initial force unit U of the flap control system is designed to carry in addition to the flap loads to hold the flaps F lowered at high angles of attack, the aileron loads in order to hold ailerons A down to avoid flap movement. These initial force unit loads, due to the ailerons, will, however, be relatively small and of no great magnitude.

When the pilot's control S is actuated and one aileron A is fully raised, vector "VN" has changed to "VR" on the side of the raised aileron and to "VL" on the opposite side, so that the resulting action upon the initial force unit U is the sum total of the instantaneous moments. Such actuation of the lateral control system is indicated by the dotted line position of cranks 45 in Fig. 3, in which the left aileron A has been fully raised. The change in moment about pivot 61 on the right crank 60 where the force "VN" has changed to "VL" is not large, but will tend to decrease, and on the opposite or left crank 60, the change in "VN" to "VR" has changed the moment tending to reverse the direction of rotation of the floating crank 60 about its axis 61. Both of the foregoing changes tend to lower the wing under flaps F. The critical flight condition is near or beyond the stall, at which point the flaps F are ordinarily fully lowered against suitable stops, such as hereinbefore referred to, so that the flaps will not actually lower. If the flaps F are not fully lowered, then the push-pull tube flap control system of Fig. 1, will cause equal or parallel lowering of the flaps on both wings W so that the flap action will be neutral.

However, my invention includes as a further important feature thereof, the provision of a relationship between the connecting elements of the flap and lateral control systems, such that, actuation of the lateral control system will tend to raise the wing flaps F, with the wings W and their flaps in high attack angle flight. Such an arrangement may take the form shown in Fig. 7 of the accompanying drawings, in which the lateral control system cranks 45 are mounted on the floating cranks 60, respectively, of the flap control system, so that, during high angle of attack flight, the action of the resultant force passing through each crank 45, pivot 46 will, when the lateral control is actuated, cause a change in moment tending to raise the wing flaps F, and of a sufficient magnitude to overcome the initial force unit U allowance and result in some upward movement of the wing flaps F.

Figure 7:
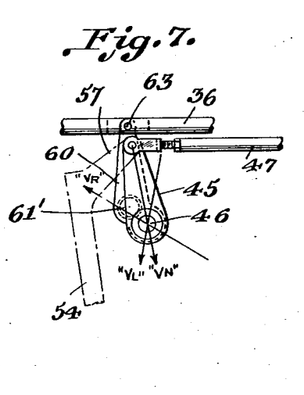
Fig. 7 is a detail fragmentary view in top plan of a modified mounting and relative arrangement of flap control system floating crank and aileron crank, of Fig. 3.

In the example of Fig. 7, the pivot or axis 61 of each floating crank 60 is relocated thereon and moved forwardly of and with respect to the pivot 46 of each crank 45 to the position 61' of Fig. 7. Thus, the moment produced by force "VL" about pivot 61', in comparison with the force "VN" about 61', is considerably greater and because the magnitude of force "VR" is considerably greater than force "VN", the moment change from "VN" to "VR" about pivot 61' also represents positive increase. The sum total of the moment change overcomes the initial force applied by unit U and of a magnitude to balance forces "VN" about pivot 61', with the result that the wing flaps F raise or swing upwardly to some extent and thereby in effect reduce the wing angle of attack. Such reduction in angle of attack is followed by a change in speed of flight, and center of wing pressure and wing downwash which may be acting on the tail surfaces, all of which tends to avoid and prevent stalled flight. Therefore, the use of full lateral control under stalled flight conditions not only produces effective rolling control without adverse yaw, but also tends to bring the aircraft out of the stall. All of these factors thus contribute to an increase in flight safety and particularly avoid and prevent the incipience of the uncontrolled spin.

Reference has been made hereinbefore to my copending U. S. patent application, Serial No. 476,155, now Patent 1,959,236 granted May 15, 1934, and to the inclusion in the present invention of the flap control system and force unit arrangements thereof, as well as of the U. S. Patent 1,875,593, issued to me September 6, 1932. In this connection, the use with the interrelated and connected flap and lateral control systems of the instant invention, of separate initial force units for each wing or side, or with the type of force unit of the above referred to application, results in a variation in operation from the parallel motion actuated flap control of the example illustrated specifically herein. For the arrangement of aileron cranks 45, mounted cranks 60 of Fig. 3 hereof when in position for or near high angle of attack with flaps lowered, the substantial raising of an aileron A will cause the flap F on that side of wing to lower somewhat unless fully depressed against stops. On the opposite wing W where the aileron A thereof remains substantially stationary and without movement, the flap F movement of such wing will be very slight, and if desired, a slight raising movement of flap F can be secured by locating crank axis 61 about midway between its disclosed position in Fig. 3 and its position as 61' in Fig. 7, but to the rear of force vector "VR". For conditions beyond the stall certain advantages may result because the increased flap depression for such conditions on the wing with the raised aileron, by increasing the stall, also decreases lift and the additional resistance is on the proper side to create favorable yaw characteristics. On the contrary, under such conditions, slight raising of the opposite wing flap F increases the lift and decreases the drag.

Figure 6:
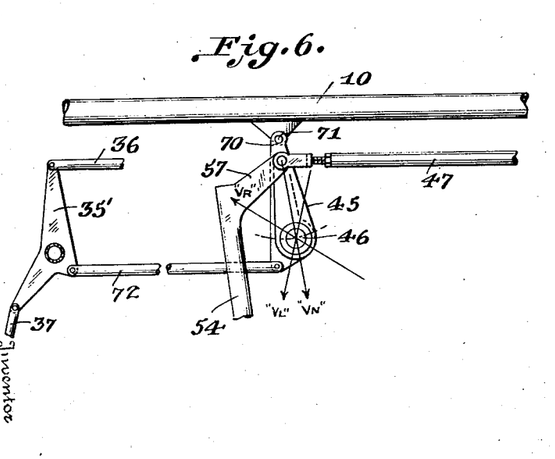
Fig. 6 is a detail fragmentary view in top plan of a modified arrangement and mechanism for operatively coupling and interrelating the lateral control system with the wing flap system in accordance with certain features of the invention, the arrangement to one aileron or lateral control surface only being shown.

A modified arrangement of mechanism for interconnecting and interrelating the wing flap and lateral control systems in accordance with the invention, is somewhat diagrammatically disclosed in Fig. 6 of the drawings. In the illustrated arrangement a floating bracket or support arm 70 is pivotally mounted on a pivot pin or stud shaft 71 which is suitably supported in fixed position on the wing structure, as from the forward wing beam 10. The bracket 70 extends horizontally from pivot 71 rearwardly of the wing and mounts the aileron system crank 45 on the pivot pin 46, in the manner hereinbefore described. The forward free end of crank 45 has the tube member 47 and offset arm 57 of aileron push-pull tube 54, pivotally coupled thereto, as previously explained, for actuating an aileron A. A wing flap actuating crank 35' is mounted in the wing spaced outwardly thereof from bracket 70 and its aileron crank 45, and the forward arm of crank 35' is pivotally connected to tube 36 of the flap control system, while the rear arm of crank 35' is coupled to the tube 37 of such system which leads to a wing flap F. A restraining link 72 couples the rear end of bracket 70 to the crank 35' at a point on the crank adjacent but slightly to the rear of the axis about which crank 35' swings, as will be clear by reference to Fig. 6.

The operation of the arrangement of Fig. 6, is similar to that described with respect to the cranks 45 and 60 of Fig. 1, in that the ailerons A of the wings will raise and lower as flaps F raise and lower, so as to maintain and carry out wing contour. For example, as a wing flap F raises, push-pull tube 54 is moved slightly rearwardly, because the axis of pivot 71 of bracket 70 is to the left or at the outer side of the aileron crank pivot axis 46, as indicated by the dotted arc through which control crank pivot 46 swings. Thus, this rearward movement of tube 54 causes an upward movement of an aileron A as a flap F raises and moves tube 37 forwardly to rock crank 35' and pull link 72 outwardly.

Reference to the indicated force vectors in Fig. 6, will show that forces "VR" and "VL" will both produce a moment tending to raise the wing flap F. The force "VN" has no effect upon the flap system as it passes through the axis of bracket pivot 71.

The lateral control system of the invention as exemplified by the specific mechanical expression of the instant example, is of course of general adaptability and not in any sense limited to use with the variable lift wing disclosed, or to any particular form or type of variable lift or conventional wing. With the control stick S as disclosed in Fig. 5 hereof, if found desirable to increase the differential movement of the aileron control system cranks, so that there will be still less motion on the control dead center arc relative to motion over the operating arc, the control tubes may cross to opposite attachment points on stick S, one passing in front and the other to the rear, as indicated by the dotted lines in Fig. 5. It is to be further understood, of course, that any other desired or usual pilot's control member or unit can be employed, such for example as the control wheels and their associated mechanisms of the art.

While I have illustrated the various features of my invention as embodied and incorporated in a variable lift wing of the longitudinal passageway—trailing under flap type, it is to be definitely understood that I recognize the adaptability of the invention to wings of the variable lift types without passageways, as well as those of the slotted types in which leading edge flaps, vanes or auxiliary airfoils are employed, and my invention includes and covers within its scope the use of such wings.

With respect to the term "aileron" as employed herein and in the appended claims, while vertically swinging lateral control surfaces of the aileron type are specifically shown in the illustrated example, such term is used and intended in a broad, generic sense to cover and include any form of lateral control surface or the equivalent.

It is also evident that various other changes, modifications, variations, eliminations, additions and substitutions might be resorted to without departing from the spirit and scope of my invention, and hence, I do not desire to limit myself in all respects to the exact and specific disclosures hereof.

What I claim is:

1. In a wing of the high lift type, lift varying wing flaps, an automatically operating control system for said flaps, a lateral control system including lateral control surfaces actuated thereby, and means connecting the flap control system with the lateral control system to actuate the flap control system to simultaneously move the flaps in the same direction to adjust flap setting when the lateral control system is operated.

2. In a wing, in combination, a wing flap, a lateral control system including lateral control surfaces differentially actuated thereby for lateral control, and means operatively associating the wing flap with the lateral control system for moving the flap in the same direction throughout its span to adjusted positions varying the wing lift by operation of the lateral control system to differentially actuate the lateral control surfaces.

3. In a high lift wing including a wing flap and a control system therefor, a lateral control system including control surfaces actuated thereby, said flap and lateral control surface systems operatively interconnected, and an initial force unit operatively associated with continuously applying forces to and serving both systems.

4. In a high lift wing, a lateral control surface and operating system therefor, wing flaps and a control system for causing parallel motion operation of the flaps, and means controlled by the lateral control operating system to cause partial raising of said flaps upon actuation of the lateral control surface by its operating system.

5. In combination, a wing having a wing lift varying flap member and a control system therefor, a lateral control system including opposite wing ailerons actuated thereby and a pilot's control member for operating the lateral control system, a crank member for each aileron in and actuated by the control system for transferring motion to raise an aileron when pilot's control is operated in one direction and to cause the aileron to remain substantially without motion when pilot's control is operated in the reverse direction, said aileron crank members operatively connected in and movable by the flap control system to simultaneously lower the ailerons when the flap member is in lift increasing positions, and said lateral control system operable in all positions to which the ailerons are moved by the flap control system.

6. In a variable lift wing having an air displacement passage, a flap member movably mounted on the wing forming a portion of the wing under surface and controlling air displacement through said wing passage, said flap movable to positions varying the wing lift, an aileron mounted on the wing, a control mechanism for actuating said aileron for lateral control, and means operatively coupling said flap member with said control mechanism and aileron for actuation by lift varying movements of the flap member to adjust the aileron relative to the position of the flap, said aileron operable for lateral control by said mechanism in any position to which adjusted by said flap.

7. In a variable lift wing, a flap member vertically movably mounted on the wing to vary wing camber and lift capacity of the wing, vertically movable lateral control surfaces mounted on the wing above and independently of said flap member, mechanism for differentially actuating said control surfaces for lateral control, means operatively coupling said wing flap with said mechanism and control surfaces for actuation by camber varying movements of the flap to raise and lower the control surfaces simultaneously as the flap raises and lowers, and said mechanism operable to differentially actuate the control surfaces in any position to which said surfaces are moved by said flap actuated means.

8. In a variable lift wing, a flap member forming a portion of the wing under surface and movable to vary the wing under surface camber, an aileron vertically movably mounted on the wing independently of said flap and forming a portion of the wing upper surface above the flap, control mechanism for actuating the aileron for lateral control, means operatively coupling said flap member with said aileron and actuated by camber varying movements of the flap member to vertically move the aileron to vary the upper surface camber of the wing, and said control mechanism operable to actuate the aileron for lateral control with the aileron in any position to which moved by said flap actuated means.

9. In a variable lift wing, a flap member forming a portion of the wing under surface and movable to vary the wing under surface camber, ailerons vertically movably mounted on the wing independently of said flap and forming portions of the wing upper surface above the flap, control mechanism for differentially actuating said ailerons for lateral control, means operatively coupling said ailerons with said flap for actuation by movements of the flap to simultaneously raise and lower said ailerons to vary the upper surface camber of the wing as the flap raises and lowers and said control mechanism operable to differentially actuate said ailerons for lateral control in any position to which the ailerons are moved by said flap actuated means.

10. In a variable lift wing having an air displacement passage, a wing flap member forming a portion of the wing under surface and vertically movable to vary the wing under surface camber, said flap mounted to control discharge of air through said passage by the vertical flap movements, vertically movable ailerons mounted on the wing above and independently of said flap and forming portions of the wing upper surface, control mechanism for differentially actuating said ailerons for lateral control, means operatively coupling said camber varying wing flap with said ailerons for actuation by vertical movements of the flap to simultaneously lower and raise the ailerons to vary upper surface camber of the wing as the flap lowers and raises, and said ailerons differentially operable for lateral control by said control mechanism in any position to which adjusted by said flap actuated means.

11. In a variable lift wing having an air displacement passage discharging rearwardly therethrough, a vertically movable wing flap forming a portion of the rear under surface of the wing, a vertical movable aileron forming a portion of the rear upper surface of the wing above said flap, said aileron and flap in normal positions having their trailing edges meeting to substantially close said passage and carry out the normal contour of the wing, said flap downwardly movable to positions increasing the under surface camber of the wing and opening said passage for discharge of air therethrough, control mechanism for vertically moving said aileron for lateral control, means operatively coupling said wing flap with said aileron for actuation by lowering of the flap to lower the aileron in spaced relation to the flap to increase upper surface camber of the wing, and said control mechanism operable to actuate said aileron independently of said flap in any position to which the aileron is lowered by said flap actuated means.

12. In a variable lift wing having an air displacement passage, means operable to open and close said passage to control air displacement therethrough, vertically movable lateral control surfaces on the wing, control mechanism for differentially actuating said surfaces for lateral control, mechanism coupling said means with said control mechanism and lateral control surfaces for actuation to simultaneously lower and raise said surfaces to adjusted positions as said means opens and closes said passage, and the said control surfaces differentially operable for lateral control by said control mechanism in any position to which adjusted.

13. In a wing, in combination, lateral control surfaces forming a portion of the rear upper surface of the wing and removed from the under surface of the wing a substantially vertically movable wing flap forming a portion of the under surface of the wing for increasing wing lift, control mechanism for actuating said control surfaces for lateral control, said mechanism including a pilot operated control member, means for lowering the wing flap to increase wing lift, said flap lowering means operatively coupled with the lateral control mechanism to lower the lateral control surfaces simultaneously to increase wing lift without actuating said pilot operated control member, and said control mechanism operable by the control member to actuate said control surfaces for lateral control in lowered lift increasing positions thereof without causing lateral control functioning of said flap.

14. In a wing, in combination, a flap forming a portion of the wing under surface and movable to positions increasing wing lift, a lateral control surface on the wing substantially above said flap and forming a portion of the wing upper surface, control means for moving said flap, mechanism for operating said control surface for lateral control and including a pilot actuated control member, mechanism operatively coupling said flap control means and lateral control operating mechanism for moving the aileron and flap in the same direction under the action of the flap control means independently of and without actuating said pilot control member and the pilot's control member and lateral control mechanism operable to actuate the aileron separately from the flap for lateral control.

15. In a high lift wing, an automatically functioning flap forming a portion of the lower surface of the wing and movable by the action of varying airflow conditions thereon between a raised position under low angle of attack flight conditions and a lowered lift increasing position under high angle of attack flight conditions, a lateral control surface movable to a lift increasing position overlapping the raised position of said flap, and positive means coordinating said flap and lateral control surface to prevent interference therebetween throughout their operating ranges.

16. In a wing, a flap movable between maximum raised and lowered positions, lateral control surfaces above said flap and simultaneously movable to parallel positions overlapping the maximum raised position limit of the flap, and means operatively coupling the flap and control surfaces to maintain a positive and non-interfering relationship between the flap and control surfaces.

17. In an airplane, a high lift wing, lateral control means, means separate from said lateral control means for increasing wing lift under high angle of attack conditions of flight, and means associated with said lift increasing means and actuated by operation of said lateral control means to cause said lift increasing means to reduce the angle of attack of the airplane.

18. In a high lift wing, a substantially vertically movable lift varying flap member, means for lowering said flap member to lift increasing position under high angle of attack flight conditions, lateral control surfaces on the wing, mechanism for differentially actuating said surfaces for lateral control, and means operatively associated with said control mechanism for partially raising said flap member from a lowered lift increasing position when the control mechanism is operated to differentially actuate said control surfaces for lateral control.

19. In a high lift wing, a substantially vertically movable lift varying flap member, a control system for said flap member, a lateral control system including differentially operable vertically movable lateral control surfaces actuated thereby, said flap and lateral control systems operatively interconnected whereby the control surfaces are simultaneously lowered and raised as the flap member lowers and raises, initial force means operatively associated with and serving both systems to continuously exert forces thereon tending to lower the flap and control surfaces, and the lateral control system operable to differentially actuate said control surfaces for lateral control in any position to which moved by said flap control system and force means.

20. In a high lift wing, vertically movable lateral control surfaces, mechanism for differentially actuating said surfaces for lateral control, wing flaps mounted on the wing in position below and substantially overlapped by said control surfaces, said flaps substantially vertically movable for varying lift of the wing, a control system operatively connecting and causing parallel motion of said flaps, means operatively coupling said flap control system with said control actuating mechanism for simultaneously lowering and raising said control surfaces as the flaps lower and raise, and said lateral control surfaces differentially operable for lateral control by said mechanism in any position to which the surfaces are moved by movements of said flaps.

21. In a high lift wing, vertically movable lateral control surfaces, mechanism for differentially actuating said surfaces for lateral control, wing flaps substantially vertically movable for varying lift of the wing, a control system operatively connecting said flaps for parallel vertical movements thereof, means operatively coupling said flap control system with said control surface actuating mechanism for simultaneously lowering and raising said control surfaces as the flaps lower and raise, said mechanism operable to differentially actuate said control surfaces for lateral control in any position to which the flaps are moved by said control system, and the means operatively coupling the flap control system with said control mechanism operable by lateral control actuation of said mechanism to raise said flaps from a lowered lift increasing position.

22. In a variable lift wing, a wing flap movable downwardly to increase wing camber and lift capacity, a lateral control system for the wing including a lateral control surface mounted on the wing above the wing flap, and means operatively associating the lateral control system with the wing flap to actuate such system to lower the control surface when the flap moves downwardly into vertically spaced relation with said flap.

23. In a variable lift wing, a movable wing flap, means for lowering the wing flap to increase wing camber and lift capacity with the wing at high attack angle conditions of flight, a lateral control system for the wing including lateral control surfaces mounted on the wing independently of and spaced vertically from said flap, and means operatively associating the lateral control system with the flap lowering means to actuate the control system to simultaneously lower said control surfaces when the flap is lowered by said means.

24. In a variable lift wing, a wing flap forming a portion of the trailing under surface of the wing, said flap downwardly movable to increase wing under surface camber, a lateral control surface mounted on the wing above and separately from said flap and forming a portion of the trailing upper surface of the wing, lateral control surface operating means operatively associated with said flap and actuated by under surface camber increasing downward movement thereof to move said lateral control surface downwardly to increase the upper wing surface camber, said lateral control surface operable for vertical lateral control movement by its operating means independently of said wing flap in all positions of the control surface.

25. In a variable lift wing, a wing flap movable to vary wing camber, a flap control system including a push-pull member operatively associated with the flap, a crank member pivotally mounted on the wing for swinging on a fixed axis and having a free end coupled to said push-pull member, a lateral control system including a lateral control surface actuated thereby, a crank in the lateral control system pivotally mounted on said flap control system crank member, and a push-pull member for swinging said lateral control system crank on and independently of said crank member, said lateral control system crank bodily moved by swinging of said crank member in moving said flap to actuate the lateral control system to adjust the position of said lateral control system and the lateral control surface operable for lateral control independently of the flap and its control system in any adjusted position of the lateral control surface.

26. In combination, opposite wings each of the variable lift type having a vertically movable wing flap and a vertically movable lateral control surface, a wing flap control system for simultaneously raising or lowering said opposite wing flaps, said flap control system including a flap operating member on each wing, a crank member mounted on each wing for swinging about a fixed axis and having a free end coupled with a flap operating member, a lateral control system for differentially operating said opposite control surfaces for lateral control, said lateral control system including a crank pivotally mounted on each flap control system crank member, and a control surface operating member connected with each crank for swinging the same on and independently of the crank member on which mounted, said lateral control system cranks simultaneously bodily moved by swinging of the crank members on which mounted as the opposite wing flaps are raised or lowered to simultaneously actuate the lateral control system to raise or lower said opposite lateral control surfaces, and the lateral control system operable for lateral control actuation of said surfaces in all positions to which the surfaces are moved by said flap control system.

27. In a variable lift wing, a wing flap vertically movable to vary wing camber, a flap control system including; a push-pull member disposed in the wing longitudinally thereof, operative connections from said member to the wing flap for raising and lowering the flap by actuation of said member, and a crank member pivotally mounted within the wing on a fixed axis thereon and having a free end coupled with said push-pull tube for swinging thereby; a vertically movable lateral control surface on the wing; a lateral control system for lateral control actuation of said surface, said system including; a crank pivotally mounted on and carried by said flap control system crank within the wing, a pilot actuated push-pull tube within the wing for swinging said crank on and independently of the flap control crank member, and operative connections from said crank to the lateral control surface; said lateral control system crank bodily moved by swinging of said flap control system crank member in raising or lowering the flap to actuate the lateral control system independently of lateral control operation thereof and raise or lower to lateral control surface to adjusted positions on the wing.

28. In a variable lift wing having an air displacement passage therethrough for varying wing lift, a member movably mounted on the wing for controlling air displacement through said passage to vary wing lift, a lateral control surface mounted on the wing, control mechanism for operating said surface for lateral control, and means operatively coupling said member with the lateral control mechanism for actuation by air displacement controlling movements of said member to adjust the normal position of said control surface relative to the air displacement controlling position of said member, said control surface operable for lateral control by said mechanism in any position to which adjusted by movements of said member.

29. In an airplane, a variable lift wing, lateral control means, means separate from said lateral control means for increasing or decreasing wing lift capacity, mechanism operatively associating the lift capacity varying means with the lateral control means and actuated by operation of the lateral control means to cause said lift varying means to change the lift capacity of the wing, and the said mechanism actuated by operation of said lift increasing means to increase or decrease wing lift, to actuate the lateral control means to increase or decrease wing lift independently of lateral control operation of said latter means.

30. In a variable lift wing, in combination, a flap member movably mounted on the wing to vary lift capacity of the wing, lateral control surfaces mounted on the wing, mechanism for differentially actuating said control surfaces for lateral control, means operatively coupling said flap member with said lateral control mechanism for actuation by lift capacity varying movements of the flap member to simultaneously move said control surfaces in the same direction, said mechanism operable to differentially actuate the control surfaces in any position to which such surfaces are moved by said flap actuated means, and the means coupling the lateral control mechanism with said flap member actuated by lateral control operation of said mechanism to adjust the lift varying position of said flap member.

31. In a variable lift wing, in combination, a lift varying flap member forming a portion of the wing under surface and movable to vary the wing under surface camber, an aileron mounted on the wing for movement independently of the flap and forming a portion of the wing upper surface above the flap, control mechanism for actuating the aileron for lateral control, means operatively coupling said flap member with said aileron and actuated by lift varying movements of the flap member to move the aileron to corresponding lift varying positions on the wing, said control mechanism operable to actuate the aileron for lateral control with the aileron in any lift varying position to which moved by said flap actuated means, and the said means operated by lateral control actuation of said control mechanism to move said flap member to adjusted lift varying position.

32. The combination of an automatically operated variable lift wing having a lift varying wing flap actuated by the action of the airflow on the flap under varying flight conditions, and provided with a lateral control surface and an operating system therefor; with means positively coupling said automatically operating flap with said control surface operating system whereby operation of the flap to vary wing lift automatically causes said system to position said control surface to correspondingly vary wing lift, said control surface operable for lateral control independently of the flap in any position of the said surface.

33. The combination of, an automatically operated variable lift wing having wing lift capacity varying means controlled by airflow conditions acting on the wing under varying flight conditions, said wing being provided with lateral control surfaces and an operating system for actuating said surfaces for lateral control; with means positively connecting the lateral control operating system with said lift varying means, whereby lateral control operation of said system operates said lift capacity varying means to change the lift capacity of the wing.

34. In a wing having an air displacement passage extending rearwardly therethrough, an aileron vertically movably mounted on the wing forming a portion of the wing upper surface, and said aileron provided with a forwardly extended balance member moved downwardly into the wing passage by upward movement of said aileron.

35. In an aircraft lateral control system, including a pilot actuated control member, a wing, an aileron mounted on and disposed spanwise of the wing and vertically swingable, a push-pull member disposed chordwise of the wing and aileron, said push-pull member coupled to said aileron at a plurality of operating points along the span of the aileron and extending from the aileron to and connected at its opposite end to said pilot actuated member at a single operating point.

36. In an aircraft, a movably mounted control surface, operating mechanism opposite said control surface but spaced therefrom, and a push-pull member disposed chordwise of the control surface and operatively coupling the same with said mechanism, said push-pull member connected to said mechanism opposite the control surface at a single operating point and extending therefrom to and coupled with said surface at spaced operating points along the span of the control surface.

37. In a high lift wing, a wing flap movable to different positions for varying the lift capacity of the wing, lateral control surfaces on the wing, control mechanism for actuating said surfaces for lateral control, and means operated by actuating of said mechanism to operate said control surfaces for lateral control, for moving said flap into a different position to change the lift capacity of the wing.

38. In a variable lift wing having a vertically swingable lift varying flap forming a portion of the wing under surface, a vertically swingable aileron mounted on the wing forming a portion of the upper surface of the wing above said flap, said aileron provided with a forwardly extended balance portion moved downwardly when the aileron is raised to overcome the negative pressure acting on the aileron caused by said wing flap beneath the aileron, and the wing formed to receive said balance portion in downwardly moved positions.

39. In a variable lift wing having a vertically swingable lift varying flap forming a portion of the wing under surface, a vertically swingable aileron mounted on the wing forming a portion of the upper surface of the wing above said under surface flap, a mass weight balance on said aileron and disposed within the wing to prevent wing flutter, an aerodynamic balance on the aileron for downward movement as the aileron is swung upwardly for airflow reaction on said balance to overcome the negative pressure on the aileron caused by said wing flap beneath the aileron, and the wing formed to receive said aerodynamic balance on downward movements thereof.

40. In a variable lift wing having an air displacement passage extending rearwardly therethrough, an aileron vertically swingably mounted on the wing forming a portion of the wing upper surface, a vertically swingable lift varying flap mounted on the wing beneath said aileron and forming a portion of the under surface of the wing, and said aileron provided with a forwardly disposed aerodynamic balance moved downwardly into the wing passage by upward swinging of said aileron.

41. In a high lift wing, a substantially vertically swingable lift varying flap member, a control system for said flap member, a pilot actuated lateral control system including differentially operable vertically swingable lateral control surfaces actuated thereby, said flap and lateral control systems operatively interconnected whereby the control surfaces are simultaneously lowered and raised as the flap member lowers and raises, initial force means operatively associated with and serving both systems independently of the pilot actuation of the lateral control system to exert forces on the systems tending to lower the flap and control surfaces, and the lateral control system operable to differentially operate said control surfaces for lateral control in any position to which said surfaces are moved by said flap control system and force means.

42. The combination of a fuselage, a variable lift wing extending to either side of said fuselage and having wing lift capacity varying means, said wing being provided with lateral control surfaces and an operating system for actuating said surfaces for lateral control; with means associating the lateral control system with said lift varying means whereby lateral control operation of said system operates said lift capacity varying means to change the lift capacity of the wing in the same sense at both sides of the fuselage.

43. In a wing, in combination, an under surface vertically swingable flap extending spanwise on the wing, lateral control surfaces forming a portion of the wing upper surface above the wing under surface flap, a control system for differentially vertically swinging said control surfaces for lateral control, and the said lateral control surfaces set in normal neutral control position at a slight negative angle in relation to the normal wing profile to provide clearance for down swinging of an aileron as the opposite aileron is swung upwardly by the control system.

44. In an airplane, oppositely extending wings, an under surface vertically swingable wing flap on said oppositely extending wings, lateral control surfaces on and forming portions of the upper surface of said opposite wings, respectively, above said under flap, said flap and lateral control surfaces thereabove in normal positions defining and carrying out the normal wing profile, the said flap and control surfaces together deflectable upwardly at the same time on said oppositely extending wings from normal position under certain flight conditions to slightly negative angle position, and stop means limiting the upward deflection of the flap and lateral control surfaces.

RANDOLPH F. HALL.